United States Patent
Schroth et al.

(10) Patent No.: US 8,663,047 B2
(45) Date of Patent: Mar. 4, 2014

(54) SUPERIMPOSED TRANSMISSION HAVING COUPLING SHAFTS

(75) Inventors: Marco Schroth, Crailsheim (DE); Kersten Hahn, Crailsheim (DE); Hartmut Garf, Urbach (DE); Karl Hilpert, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 259 days.

(21) Appl. No.: 12/999,528

(22) PCT Filed: Jul. 16, 2009

(86) PCT No.: PCT/EP2009/005165
§ 371 (c)(1),
(2), (4) Date: May 23, 2011

(87) PCT Pub. No.: WO2010/009836
PCT Pub. Date: Jan. 28, 2010

(65) Prior Publication Data
US 2011/0251009 A1    Oct. 13, 2011

(30) Foreign Application Priority Data
Jul. 25, 2008 (DE) .......................... 10 2008 034 607

(51) Int. Cl.
*F16H 47/08* (2006.01)
(52) U.S. Cl.
USPC ................................. 475/59; 475/35; 475/66
(58) Field of Classification Search
USPC .............................. 475/31, 33, 35, 47, 59, 66
See application file for complete search history.

(56) References Cited

U.S. PATENT DOCUMENTS

| 2,834,228 A | 5/1958 | Place |
| 3,411,382 A | 11/1968 | Mori |

(Continued)

FOREIGN PATENT DOCUMENTS

| DE | 921 729 | 11/1954 |
| DE | 1 153 267 | 8/1963 |
| DE | 1 898 249 | 8/1964 |
| DE | 275988 | 11/1969 |
| DE | 1 625 122 | 6/1970 |
| DE | 1 630 849 | 8/1973 |
| DE | 34 41 877 | 5/1986 |

(Continued)

OTHER PUBLICATIONS (*) = Foreign patent document with English language abstract, (of document DE4422444), Oct. 2, 1996.

*Primary Examiner* — Justin Holmes
(74) *Attorney, Agent, or Firm* — Faegre Baker Daniels LLP

(57) ABSTRACT

A superimposed transmission for driving a rotational speed-variable work machine having the following design: an input shaft (2) is connected to an intermediate shaft (3); a pump wheel (5) of a hydrodynamic converter (6) rotates with the intermediate shaft (3); a turbine wheel (7) of the hydrodynamic converter (6) rotates with a superposition means; the intermediate shaft (3) and the transmission means are connected to an output shaft (14) by means of a differential gear (4); and the transmission means is designed as at least one coupling shaft (10), which connection the turbine wheel (7) of the hydrodynamic converter (6) to the differential gear (4). The at least one coupling shaft (10) runs parallel to the intermediate shaft (3). An additional hydrodynamic converter (15) can be present and/or the coupling shaft (10) can be connected in an engageable manner directly to the input shaft (2) by means of an additional transmission (18) for starting the transmission.

20 Claims, 5 Drawing Sheets

(56) References Cited

U.S. PATENT DOCUMENTS

| | | | |
|---|---|---|---|
| 3,446,094 A | 5/1969 | Ohno et al. | |
| 3,890,855 A | 6/1975 | Reenskoug | |
| 4,375,171 A * | 3/1983 | Morscheck | 74/331 |
| 4,718,298 A * | 1/1988 | Ohkubo | 475/34 |
| 4,724,720 A | 2/1988 | Ohkubo | |
| 4,726,255 A | 2/1988 | Humpfer et al. | |
| 4,788,887 A | 12/1988 | Lepelletier | |
| 4,960,005 A * | 10/1990 | Kashiwase | 74/329 |
| 5,417,125 A * | 5/1995 | Janiszewski | 74/359 |
| 6,209,407 B1 * | 4/2001 | Heinzel et al. | 74/331 |
| 7,597,644 B2 * | 10/2009 | Rodgers, II | 475/218 |

FOREIGN PATENT DOCUMENTS

| | | |
|---|---|---|
| DE | 4 422 444 | 10/1996 |
| DE | 44 22 444 | 10/1996 |
| FR | 1.226.770 | 4/1960 |
| FR | 1.325.887 | 3/1963 |
| FR | 2 589 967 | 5/1987 |
| GB | 684382 | 12/1952 |
| GB | 1 208 831 | 10/1970 |

\* cited by examiner

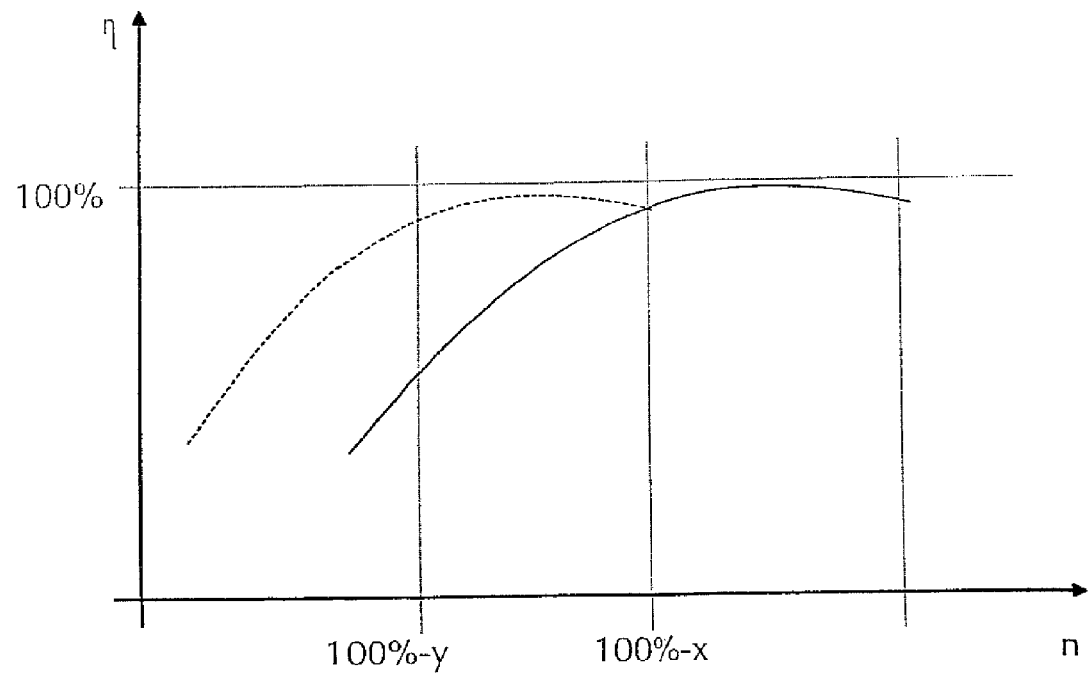
Figur 3
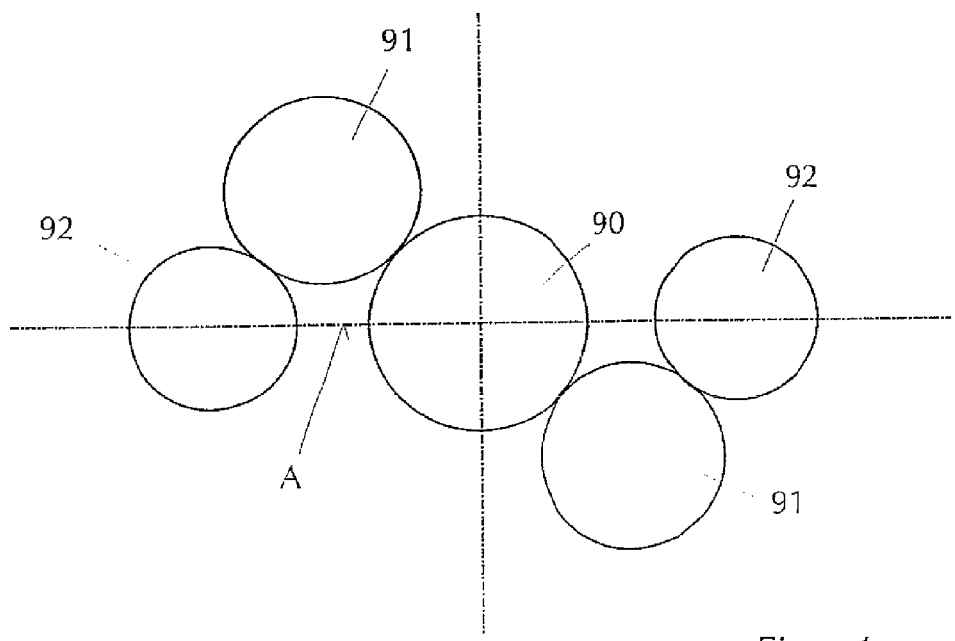
Figur 4

US 8,663,047 B2

SUPERIMPOSED TRANSMISSION HAVING COUPLING SHAFTS

CROSS-REFERENCE TO RELATED APPLICATION

This application is related to and claims the benefit under 35 U.S.C. §119 and 35 U.S.C. §365 of International Application No. PCT/EP2009/005165, filed Jul. 16, 2009, the disclosure of which is expressly incorporated herein by reference.

BACKGROUND

1. Technical Field

The invention concerns a superimposed transmission for driving a rotational speed-variable work machine having the following design:

an input shaft is connected to an intermediate shaft;

a pump wheel of a hydrodynamic converter rotates with the intermediate shaft;

a turbine wheel of the hydrodynamic converter rotates with a superposition means; and an intermediate shaft and the transmission means are connected to an output shaft by means of a differential gear.

Superimposed transmissions where a rotation speed which is applied to the output shaft via input shaft and intermediate shaft is superimposed to a second rotation speed, which is coupled out via a hydrodynamic converter and then again coupled via a matching differential gear, are substantially disclosed in the state of the art.

It may be referred for instance to the disclosure of AT-PS 275 988 or DE 34 41 877 A1. Document DE 44 22 444 A1 shows such a force-transmitting unit for driving a rotational speed-variable work machine. The unit consists of an input shaft, an output shaft by means of a hydrodynamic converter, including pump wheel, turbine wheel and guide wheel. The hydrodynamic converter is arranged coaxially with a differential gear and an output transmission member of the differential gear is permanently coupled with the output shaft.

In the state of the art, hollow shafts are employed as a transmission means between the coupling out via the hydrodynamic converter and the actuation of the differential gear. These hollow shafts, which are typically designed as rotating coaxial drums, hence exhibit the shortcoming that they are quite heavy, have a high moment of inertia and render access to the elements arranged in the hollow shaft significantly more difficult. Hence, the structure of a particularly compact transmission is finally influenced negatively by the hollow shafts.

For further reference to the state of the art, documents U.S. Pat. No. 2,834,228 A as well as FR 1 226 770 A may prove useful.

It is then an object of the present invention to avoid the shortcomings in the above mentioned state of the art and to make an optimised superimposed transmission with simple, compact and maintenance friendly structure available.

2. Description of the Related Art

The object of the invention is met in that with a superimposed transmission of the type above mentioned, the transmission means are designed as at least two coupling shafts which connect the turbine wheel of the hydrodynamic converter to the differential gear whereas said at least two coupling shafts run parallel to the intermediate shaft.

The solution provided by the invention thus provides that the transmission means are designed as at least two coupling shafts instead of one hollow shaft or rotating drums. Said at least two coupling shafts then connect the turbine wheel of the hydrodynamic converter to the differential gear, which is ideally designed as a planetary gear. Said at least two coupling shafts run parallel to the intermediate shaft and transfer the coupled out rotation speed, which is then superimposed symmetrically in the differential gear again to the rotation speed transmitted directly from input to output via the intermediate shaft. Consequently, the rotation speed of the output shaft can be influenced accordingly as in the older as well as similar common superimposed transmissions. In the sense of the present invention, by each parallel coupling shaft is meant a shaft whose rotational axis runs parallel or, to be more accurate, within the usual tolerances parallel to the rotational axis of the intermediate shaft. The rotational axes also lie spaced apart parallel close to one another and are never identical as they were arranged in the concentric structure of the intermediate shaft and of the hollow shaft surrounding said shaft according to the state of the art.

By ruling out a large hollow shaft, quite complex to control from a mechanical viewpoint, which according to the structure of the transmission reaches a comparatively large diameter and hence has matching great sizes, a simplified structure can now be obtained using said at least two coupling shafts. Also the accessibility of the elements which were arranged previously in the region of the hollow shaft, may now be significantly facilitated for assembly and maintenance work, since they are situated close to the coupling shaft and are consequently easily accessible.

SUMMARY

It may also be contemplated basically to install more than two coupling shafts. This can prove particularly meaningful for transmitting greater powers. As a matter of principle, three, four, five, six, seven, eight or even more coupling shafts can be envisioned. As regards the reduction of the transverse forces and of the mechanical accessibility of the regions situated between the coupling shafts, the number of two coupling shaft however constitutes an optimum inasmuch as the powers to be transmitted permit it.

According to a particularly advantageous embodiment of the invention, two coupling shafts are hence provided, which both lie on a plane, whereas the perpendicular projection of the intermediate shaft lies on this plane between the coupling shafts. This arrangement of at least two coupling shafts enables to compensate for the transverse forces of the coupling shafts relative to one another. Thus, the transverse forces are significantly reduced for instance with respect to a coupling shaft.

The coupling shafts are hence according to a particularly favourable embodiment of the invention connected to the turbine wheel of the hydrodynamic converter by means of a transmission. This transmission, which is designed as a spur gear transmission according to a preferred further embodiment of the invention, enables to select the rotation direction and/or rotation speed of the coupling shafts, through an appropriate transmission ratio, thus enabling an accordingly larger spread of the gear ratios and hence of the rotation speeds.

According to a particularly meaningful and advantageous further embodiment of the invention, an additional hydrodynamic converter may moreover be provided, whose turbine wheel is connected to the turbine wheel of the first hydrodynamic converter and whose pump wheel as well as that of the first hydrodynamic, is connected to the intermediate shaft.

It goes without saying that the connection of the turbine wheel of the first hydrodynamic converter with the turbine wheel of the second hydrodynamic converter is simultaneously a connection of both turbine wheels to the transmission means, here in particular to the spur gear transmission, which connects both turbine wheels to said at least two coupling shafts as transmission means. This structure enables an operating mode for improving the degree of efficiency of the superimposed transmission as can be clearly seen when explaining an operating method according to the invention for this transmission.

In a very favourable further development thereof it is moreover provided that said at least two coupling shafts end up lying axially parallel to said at least one converter. The converter is hence arranged between the intermediate shaft and the coupling shafts. For the second converter consequently the construction space can be used which when using the structure according to the state of the art, i.e. with a hollow shaft instead of the coupling shafts cannot be employed or only with extreme difficulty. As the converter is now arranged between the coupling shafts said converter may, due to the fact that the coupling shafts replace a rotating hollow shaft in this application, be controlled comparatively simply and filled with working medium or emptied.

Another particularly favourable embodiment of the invention foresees that the input shaft is connected to at least one auxiliary shaft spur gear transmission. The auxiliary shaft can for its own part be again connected via an engageable coupling to said at least one coupling shaft. This structure offers an alternative way for splitting the power, which can be used advantageously, such as for instance for starting the superimposed transmission, as explained below in detail.

In a particularly favourable further embodiment of this idea it is provided that the number of auxiliary shafts and of the engageable coupling shafts corresponds to the number of coupling shafts. This structure provides the best possible coupling and the best possible introduction of the forces in die coupling shafts whereas in particular in the case of exactly two coupling shafts the advantages mentioned initially of this second shaft can be used.

In a particularly advantageous alternative further embodiment of the idea with the auxiliary shafts it is provided that the auxiliary shafts drive at least one feeding pump. This similar configuration encountered in the structure of previous transmissions enables to drive the feeding pumps for the working medium of the hydrodynamic converters and/or lubricating pumps or other auxiliary pumps through the auxiliary shaft. The auxiliary shaft may then be connected to the coupling shafts via the pump and then the engageable coupling. The designed structure with respect to the previous designed structure of the superimposed transmission should then exclusively consist in lengthening the auxiliary shaft as well as in adding one coupling so as to exploit the advantages according to the invention.

According to a particularly favourable embodiment, the engageable coupling is hence designed as a hydrodynamic coupling. As a matter of principle, other types of engageable couplings could also be envisioned. The embodiment with a simple hydrodynamic coupling provides a certain elasticity to the connection and comparatively reduces the level of control required for the nonetheless present hydrodynamic components. The hydrodynamic coupling is eventually filled with the working medium and then ensures coupling of the auxiliary shaft to the coupling shafts, without producing a perfectly rigid connection. Discharging the working medium out of the hydrodynamic coupling enables to break the connection of the shafts. A particularly advantageous method for operating a superimposed transmission is described below, which is designed according to one of the claims 5 to 10. In the design according to the invention with two hydrodynamic converters, the superimposed transmission can be operated by using only one of both converters, as most favourably permitted by the invention. Consequently, in a first rotation speed range one of said converters can be used and in a second rotation speed range the other of said converters.

Due to the typical feature of a hydrodynamic converter, the actions of such a converter varies with the changing rotation speed. Now, the operating mode according to the method of a superimposed transmission with two converter enables using the converters in different rotation speed ranges. So, a converter can be designed in such a way that its nominal rotation speed corresponds for instance to approx. 80 to 100% of an optimal degree of efficiency. The degree of efficiency of this converter will however below 80% of the nominal rotation speed for instance be rather poor. Consequently, the second converter can now come into play with such a design that its degree of efficiency is ideally between 60 and 80% of the nominal rotation speed for instance. If now at 80% of the nominal rotation speed one of the converters is activated and the other deactivated, the best possible degree of efficiency can be achieved over the whole exemplary operating range from 60 to 100% of the nominal rotation speed.

Moreover a method according to the invention is described below, which is particularly suitable for starting the superimposed transmission according to any of the claims 7 to 10. Consequently, said at least one auxiliary shaft is connected to said at least one coupling shaft for starting the transmission and the working machine typically fixedly connected to said transmission, whereas the hydrodynamic converter(s) is(are) still maintained inactive. Once the output shaft and the working machine connected thereto have started, the hydrodynamic converter is activated while said at least one engageable coupling is opened, so that the connection between the auxiliary shafts and the coupling shafts is interrupted. The driving action is then produced by the converter(s) and the coupling shafts as well as the rotation speed directly transmitted via the intermediate shaft.

The structure then enables to start the transmission or, to be more accurate, the working machine associated therewith, when said elements exhibit such a high starting resistance, so that it would not be possible with a previous structure. Since the auxiliary shafts are coupled via another gear ratio and their rotation speed is superimposed with the directly transmitted rotation speed via the coupling shafts, the transmission can be designed in such a way that the drive motor lies on the input shaft, which can start more easily the working machine associated with the output shaft, since the gear ratio can be adjusted so that even high starting torques can be overcome.

The further advantage of this variation when starting the transmission consists in that no further starting clutch should be provided between the working machine and the superimposed transmission or, to be more accurate, the drive machine and the superimposed transmission.

According to the method it is hence provided that for activating or deactivating hydrodynamic elements such as converters or couplings said elements are always filled with the working medium or, to be more accurate, emptied for deactivating. In addition to this particularly advantageous embodiment it might also be theoretically envisioned to activate or deactivate the various elements via an appropriate number of engageable couplings.

Further advantageous aspects of the invention appear from the exemplary embodiments illustrated below, which are explained by way of example using the figures.

Wherein

BRIEF DESCRIPTION OF THE DRAWINGS

FIG. 3 is a diagrammatical illustration of efficiency curves of the primary and of the secondary converter;

FIG. 4 is a diagrammatical illustration of the transmission for driving the coupling shafts;

DETAILED DESCRIPTION

Figure 1:
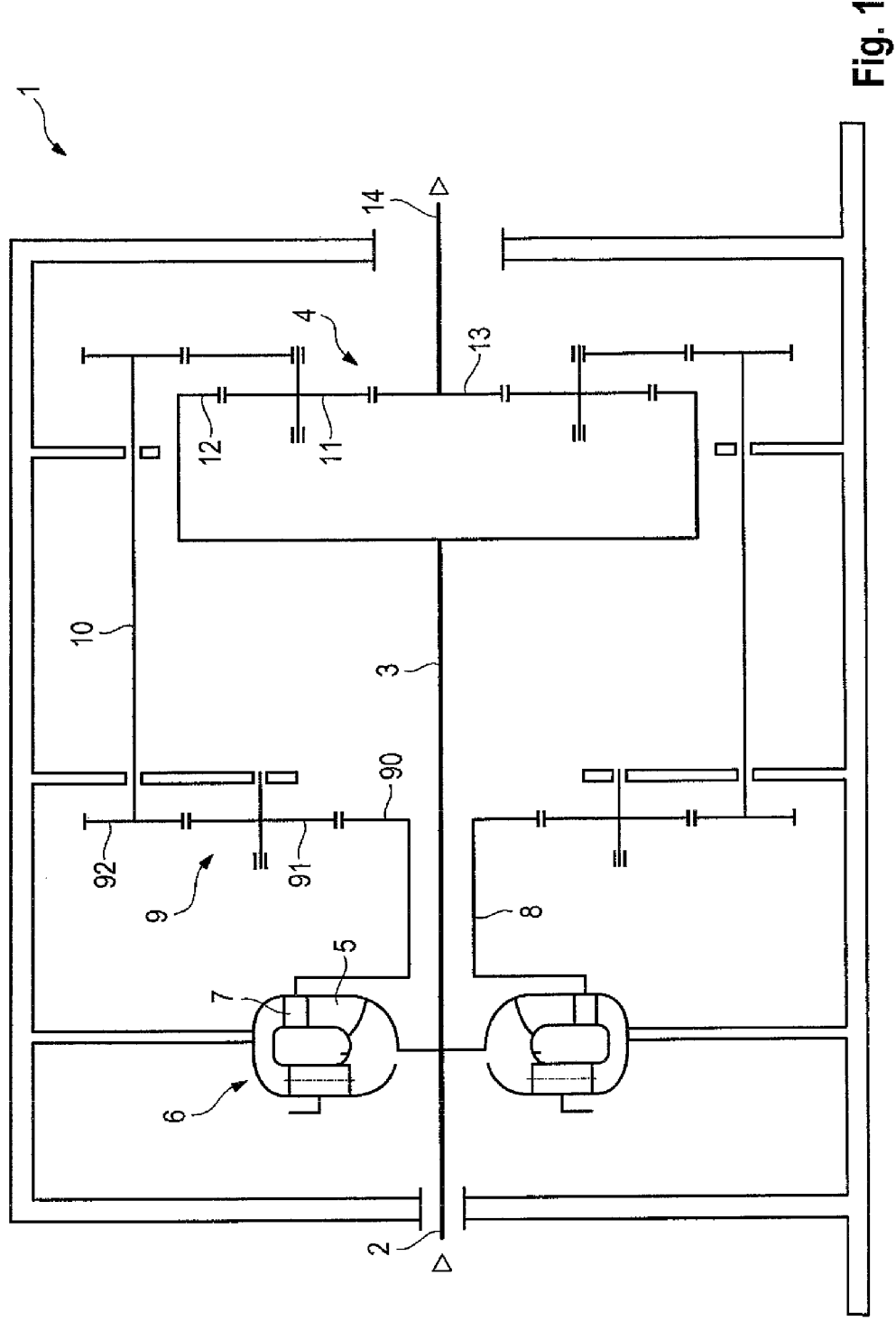
FIG. 1 is a diagrammatical illustration of a first embodiment of the superimposed transmission.

FIG. 1 clearly shows a first embodiment of the superimposed transmission 1. The structure of the superimposed transmission 1 hence includes an input shaft 2, which is connected to a intermediate shaft 3 (typically formed as a single-part with the input shaft 2) with a differential gear 4 on the one hand and the pump wheel 5 of a hydrodynamic converter 6 on the other hand. A section of the power injected into the transmission 1 over the input shaft 2 is branched off using a turbine wheel 7 of the hydrodynamic converter 6. This power is conveyed to a transmission 9 over the turbine wheel 8, which is designed as a spur gear transmission in a preferred manner. In the illustrated embodiment the spur gear transmission 9 hence shows a central toothed gear 90, which will be designed typically as a hollow wheel using the intermediate shaft 3 going therethrough. Said hollow wheel is connected to the turbine wheel 8 and consequently to the turbine 7 and drives two further toothed gears 91, which again drive one of the toothed gears 92. The spur gear transmission 9 so conveys the power flow to the coupling shafts 10, which are connected to the toothed gears 92, and to the differential gear 4 over the coupling shafts 10. The differential gear, which here is designed as a planetary gear 4, then superimposes the rotation speed transmitted over the coupling shafts 10 with the rotation speed transmitted via the intermediate shaft 3. In the case represented, the rotation speed transmitted over the coupling shafts 10 is conveyed to the web 11 of the planetary gear 4, while the power carried via the intermediate shaft 3 reaches the planetary gear 4 via the hollow wheel 12. Power take-off is accomplished through the sun wheel 13, which is connected to an output shaft 14 of the superimposed transmission 1. The described coupling of a superimposed transmission should be here understood by way of example. It could also be naturally envisioned to generate power take-off via the web or the hollow wheel, and accordingly to guide both power branches over the sun wheel and the hollow wheel or via the web and the sun wheel into the superimposed transmission.

Due to the well-known functionality of the superimposed transmission, with simple construction work and in particular by dispensing with a coaxial drum for transmitting the rotation speed coupled out via the hydrodynamic converter 6, the structure of the superimposed transmission can be quite easy and compact. Said structure can be varied accordingly as regards its rotation speed in the region of the output shaft 14 in the usual manner.

Figure 2:
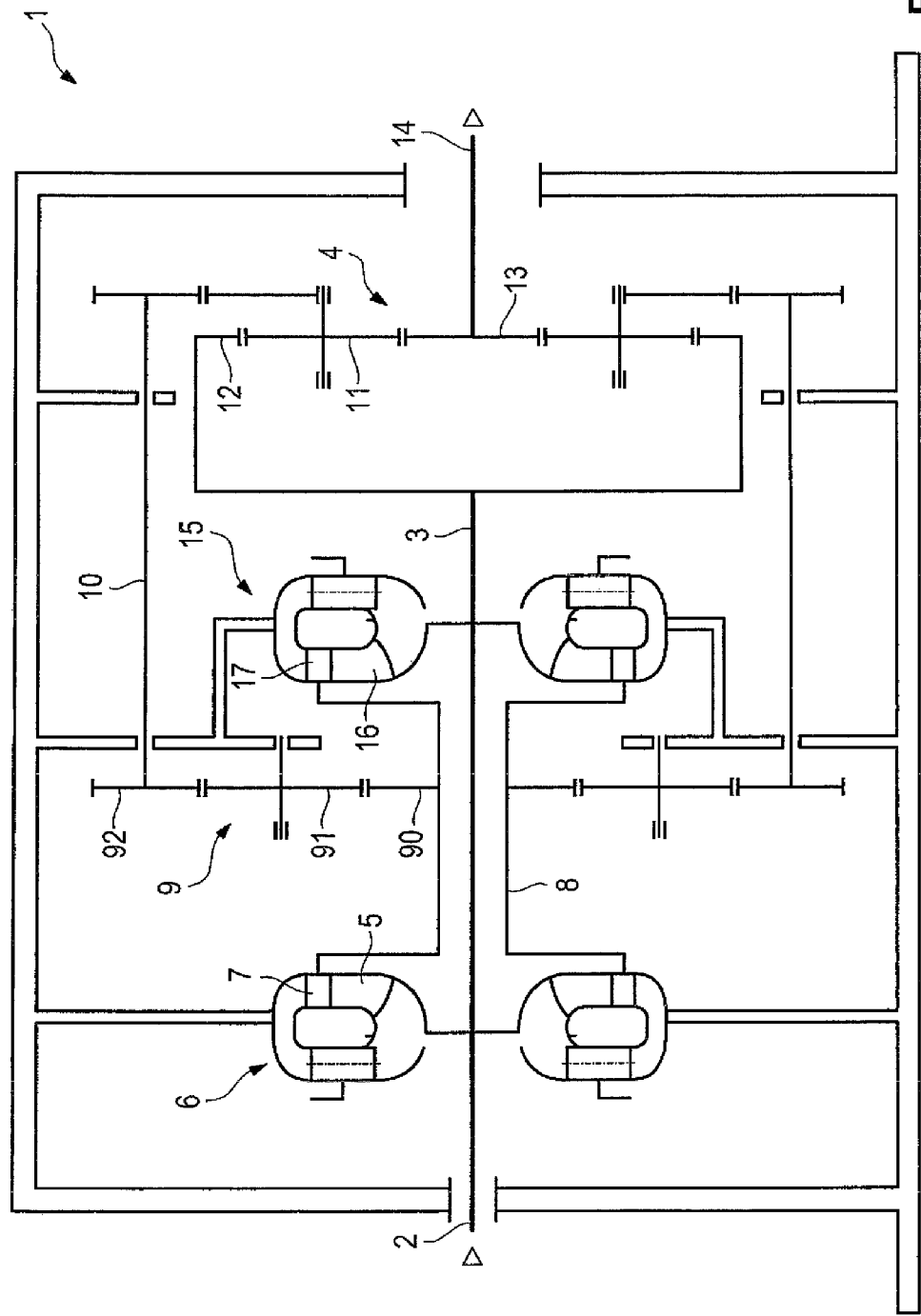
FIG. 2 is a diagrammatical illustration of a first alternative embodiment of the superimposed transmission.

FIG. 2 now shows an alternative structure of the superimposed transmission 1, whereas said transmission solely differentiates through the presence a second converter 15 with respect to the otherwise identical structure of the first embodiment described above. Accordingly, all reference signs 1 to 14 are identical to the elements illustrated above and this functionality will not be detailed further.

The second converter 15 may, as represented in the exemplary embodiment, be arranged similarly with the first converter. However, alternative embodiments can also be envisioned for instance in several steps. Also here a pump wheel 16 is connected to the intermediate shaft 3 and a turbine wheel 17 acts similarly on the turbine wheel 8, which is connected to the coupling shafts 10 via the spur gear transmission 9. The converter 15 is hence arranged between the coupling shafts, so that the structure of the superimposed transmission 1 can be extraordinary compact. Contrary to of a previous construction type with a coaxial hollow shaft the arrangement of the converter 15 is here possible without any problems since the transmission of the coupled out rotation speed via the coupling shafts 10 makes the second converter 15 accessible for controlling the guide vanes and/or for filling or emptying the converter 15 with the working medium.

The designed structure illustrated on FIG. 2 with the first converter 6 and the second converter 15 should hence be understood by way of example. In particular the functionality of both converters 6, 15 as primary converter and secondary converter is not linked to this sequence, so the primary converter could be arranged for instance between the coupling shafts 10 or similarly, as represented here by way of example, the secondary converter.

The advantage now offered by this second converter 15 for the operating mode of the superimposed transmission 1 consists in increasing the possible degree of efficiency.

FIG. 3 represents by way of example the graph of the degree of efficiency n of a hydrodynamic converter via the rotation speed n. The full line hence shows the efficiency curve of the primary converter, while the dotted line shows the efficiency curve of the secondary converter. The presence of two converters, which are connected to the turbine wheel 8 and the intermediate shaft 3 with the same efficiency, now enables to install two converters of different configuration. Thus, the primary converter can reach its optimal efficiency in the operating point usually present between 100 and 100−x, for instance 80% of the rotation speed n of the output shaft 14. With accordingly lower rotation speeds in the output shaft 14, for instance between 100−x and 100−y, for instance between 60 and 80% of the maximum rotation speed n, the second converter can be implemented, once optimised over this rotation speed range in terms of degree of efficiency n. Switching from the first to the second converter hence involves simultaneous emptying of the first converter and filling of the second converter or vice versa. In this structure with two converters, the superimposed transmission 1 with optimised efficiency can be operated according to the invention over a larger operating range.

FIG. 4 shows in a principle illustration a possible structure of the transmission 9 as seen in axial direction by way of example. The central hollow wheel 90 is hence connected to the turbine wheel 8 and consequently to the turbine 7. Said central wheel drives two further toothed gears 91, which again drive one of both toothed gears 92. These toothed gears 92 are connected to the coupling shafts 10, so that the power reaches into the differential gear 4 from the turbine wheel 8. Both toothed gears 91 are hence offset with their axes from the centre A between the axes of the toothed gears 90, 92 each sideways. In this structure selected here, we are dealing with a possibility by way of example which is however particularly favourable, since a very compact structure can be achieved by offsetting both toothed gears 91 from the centre and since the transverse forces are reduced in this structure. A structure with more than two coupling shafts 10 can be adapted accordingly by increasing the number of toothed gears 91,92.

Figure 5:
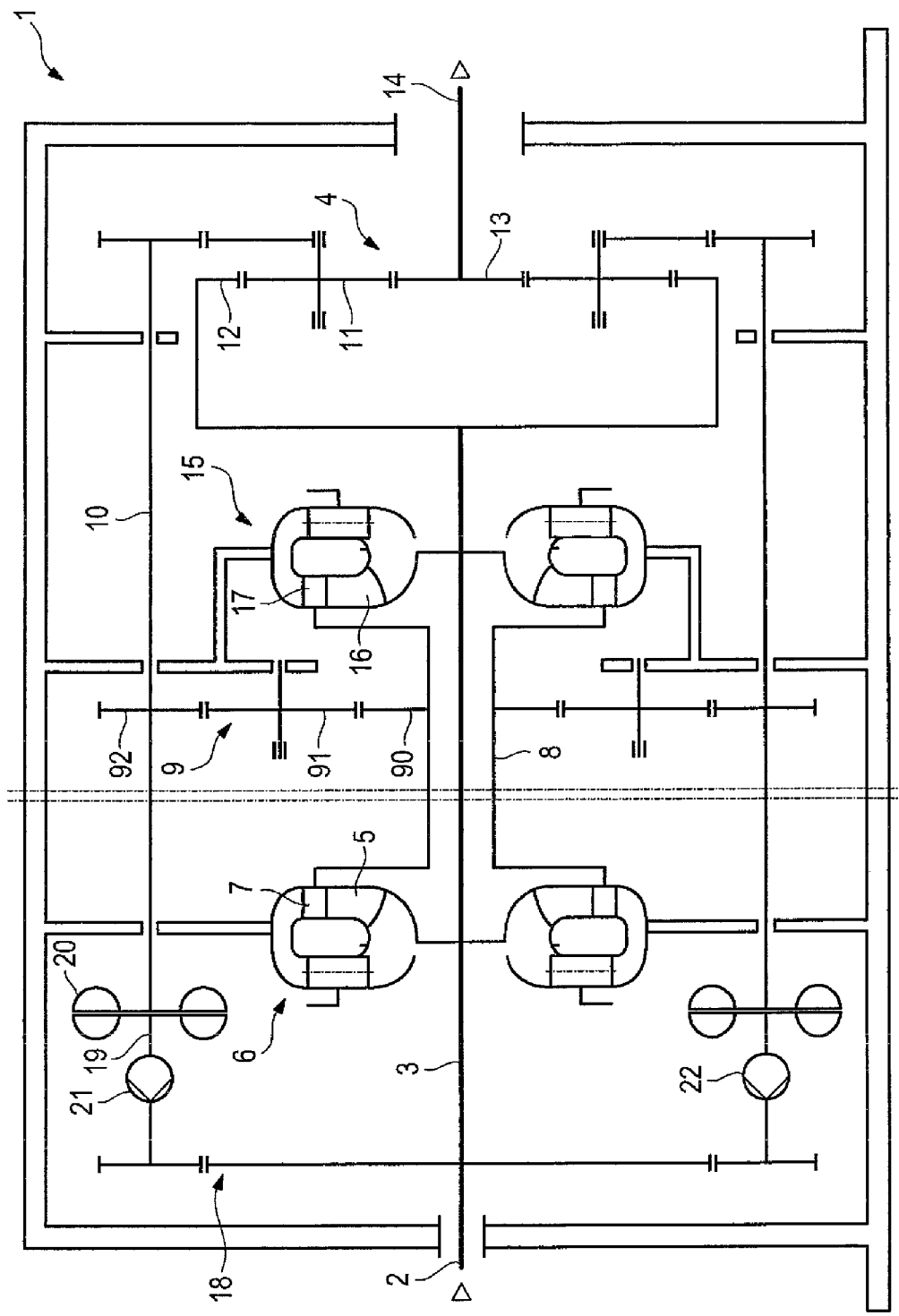
FIG. 5 is a diagrammatical illustration of a second alternative embodiment of the superimposed transmission.

The structure of FIG. 5 shows another embodiment of the superimposed transmission 1 according to the invention. Here also, all elements are provided with the same reference signs, as in FIGS. 1 and 2, so that the functionality properly speaking will not be described in more detail. It should only be emphasised that here the converter 15 arranged between the coupling shafts 10 is the primary converter, while the converter 6 is operated as the secondary converter. The superimposed transmission 1 can thus be distributed along the double dotted line so that a modular structure can be obtained. The module with the coupling shafts 10 and the primary converter 15 as well as the differential gear 4 may hence also be used on its own or be completed with another input module, as the one illustrated here.

The input module illustrated here includes, as already mentioned, the converter 6 which is provided in der functionality already described as the secondary converter. At least one auxiliary shaft 19 is connected additionally to the input shaft 2 via an additional transmission 18, which is designed as a spur gear transmission in particular. The auxiliary shaft 19, wherein two auxiliary shafts 19 are arranged in the illustrated embodiment, is then again connected with the coupling shafts 10 via an engageable coupling 20.

If required, the engageable coupling 20 can also provide a connection between the auxiliary shafts 19 and the coupling shafts 10. This can prove meaningful in particular when starting the transmission against a very high starting rotation moment of the working machine connected to the transmission and driven via the output shaft 16. It may happen in such a situation that due to the strongly counter-acting torque of the working machine, starting the transmission with a coupled motor, provided to that effect with the input shaft 2, is not possible or only with great difficulty. An alternative would be here a coupling between motor and transmission and working machine, however usually is not desirable and entails shortcomings due to the high powers to be transmitted as well as the required construction space.

The embodiment of the superimposed transmission 1 illustrated on FIG. 5 now enables to dispense with filling with working medium both converters 6 and 15 or in case only one converter is used, said converter for starting the superimposed transmission 1. The intermediate shaft 3 can then transmit the rotation speed, without cutting off power via said converter(s). If the couplings 20 are however closed, or most preferably when hydrodynamic couplings are applied, if they are filled with the working medium the coupling shafts and the auxiliary shafts 19 are then coupled, whereas said auxiliary shafts are in turn connected to the input shaft 2 via the transmission 18, which can be designed as a spur gear transmission in particular.

According to the configuration of the transmission 18 two rotation speeds are transmitted via the superimposed transmission, that is to say once via the intermediate shaft 3 and once via the coupling shafts 10 coupled with the auxiliary shafts 19. Both these rotation speeds are superimposed through the differential gear 4 in such a way that a gear ratio is possible which enables starting the transmission also against the high resistance of a working machine associated with the output shaft 16.

As soon as the starting torque is overcome and a corresponding rotation speed reached, the engageable couplings 20 are opened. When using hydrodynamic couplings, the working medium is discharged for that purpose. Then according to the desirable rotation speed range, one converter (or the other converter if present) 6,15 is filled so that the transmission as described above can be operated.

The structure illustrated here as already explained can also be envisioned in combination with a transmission having only one converter. In the preferred modular concept illustrated here, it would mean that the input module exclusively includes the transmission 18, the auxiliary shafts 19 and the couplings 20, while dispensing with the converter 6 illustrated here.

Ideally the auxiliary shafts 19 can be used moreover for operating auxiliary units such as for instance feeding pumps. This illustration of FIG. 5 represents a feeding pump 21 to that end, which is used as a lubricating oil pump, as well as a feeding pump 22, which enables filling the converters and/or couplings with the working medium.

Figure 6:
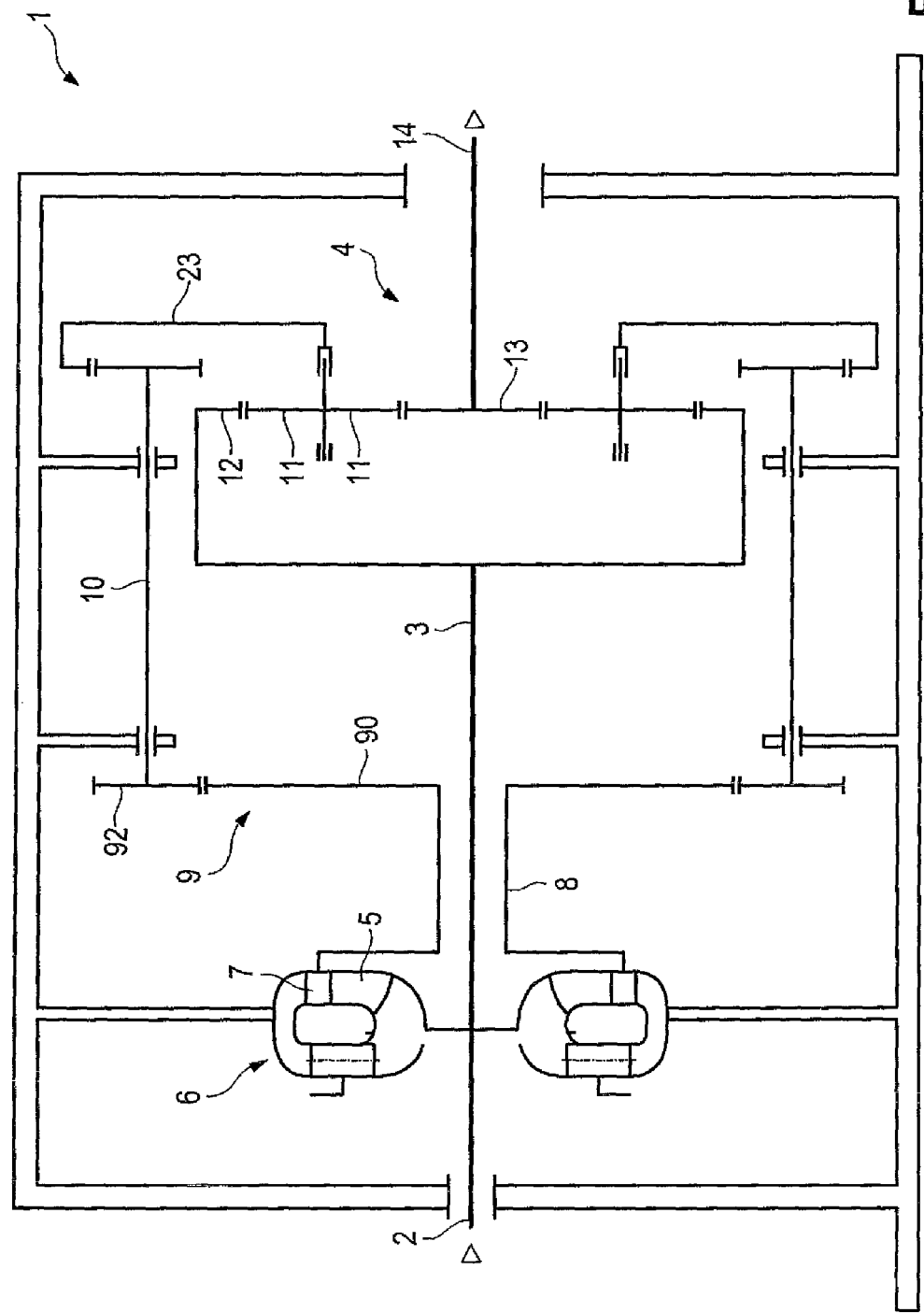
FIG. 6 is a diagrammatical illustration of a further alternative embodiment of the superimposed transmission.

FIG. 6 represents another alternative embodiment of the superimposed transmission 1. The structure is similar to that of FIG. 1, so that the elements illustrated there, which are provided with the same reference signs on FIG. 6, will not be described in more detail. The difference lies here in the configuration of the transmission 9 and of the differential gear 4. The transmission 9 dispenses with the structure having five spur wheels. Instead of that, the central spur wheel 90, which is designed typically as a hollow wheel using the intermediate shaft 3 going therethrough, drives the toothed gears 92 on the coupling shaft 10 directly, so that only one gearing stage is now present. Conversely, the differential gear 4 is designed in such a way that the coupling shafts 10 drive the web 11 thereof via an additional hollow wheel 23. The required reversal of the rotation direction in this special case can hence take place in the power flow downstream of the coupling shafts 10 in the differential gear 4.

The structure illustrated here of the superimposed transmission according to the invention can be compact and provide a superimposed transmission which can be operated under ideal conditions over all the operating ranges. Moreover, the structure illustrated here can be modular, so that different transmission variations can be offered at reasonable production costs.

The invention claimed is:

1. A superimposed transmission for driving a rotational speed-variable work machine, comprising:
    an input shaft connected to an intermediate shaft;
    a pump wheel of a hydrodynamic converter rotates with the intermediate shaft;
    a turbine wheel of the hydrodynamic converter rotates with a transmission;
    the intermediate shaft and the transmission are connected to an output shaft by a differential gear;
    comprises at least two coupling shafts which connect the turbine wheel of the hydrodynamic converter commonly with the differential gear, wherein said at least two coupling shafts run parallel to the intermediate shaft.

2. A superimposed transmission according to claim 1, wherein said at least two coupling shafts comprise two coupling shafts, which both lie on a plane between the coupling shafts as seen in the perpendicular projection of the intermediate shaft.

3. A superimposed transmission according to claim 2, wherein the coupling shaft(s) are connected to the turbine wheel of the hydrodynamic converter by means of a transmission.

4. A superimposed transmission according to claim 2, further comprising an additional hydrodynamic converter having a turbine wheel connected to the turbine wheel of the first hydrodynamic converter and a pump wheel connected to the intermediate shaft.

5. A superimposed transmission according to claim 2, wherein the input shaft is connected to at least one auxiliary shaft via an additional transmission, the auxiliary shaft connectable to one of said at least two coupling shaft by means of an engageable coupling.

6. A superimposed transmission according to claim 1, further comprising an additional hydrodynamic converter having a turbine wheel connected to the turbine wheel of the first hydrodynamic converter and a pump wheel connected to the intermediate shaft.

7. A superimposed transmission according to claim 1, wherein the coupling shaft(s) are connected to the turbine wheel of the hydrodynamic converter by a transmission.

8. A superimposed transmission according to claim 7, wherein the input shaft is connected to at least one auxiliary shaft via an additional transmission, the auxiliary shaft connectable to one of said at least two coupling shaft by means of an engageable coupling.

9. A superimposed transmission according to claim 7, wherein the transmission comprises a spur gear transmission.

10. A superimposed transmission according to claim 9, further comprising an additional hydrodynamic converter having a turbine wheel connected to the turbine wheel of the first hydrodynamic converter and a pump wheel connected to the intermediate shaft.

11. A superimposed transmission according to claim 9, wherein the input shaft is connected to at least one auxiliary shaft via an additional transmission, the auxiliary shaft connectable to one of said at least two coupling shaft by means of an engageable coupling.

12. A superimposed transmission according claim 1, wherein the input shaft is connected to at least one auxiliary shaft via an additional transmission, the auxiliary shaft connectable to one of said at least two coupling shafts by an engageable coupling.

13. A superimposed transmission according to claim 12, wherein at least one feeding pump is driven by means of said at last one auxiliary shaft.

14. A superimposed transmission according to claim 12, wherein said at least one engageable coupling is designed as a hydrodynamic coupling.

15. A method for starting the superimposed transmission according to claim 12, comprising:
   starting the superimposed transmission with said at least one auxiliary shaft connected to said at least one coupling shaft, while the hydrodynamic converter(s) are maintained still inactive; and
   activating one of the hydrodynamic converter and the additional hydrodynamic converter once the output shaft has started, whereas said at least one engageable coupling is opened.

16. A superimposed transmission for driving a rotational speed-variable work machine, comprising:
   an input shaft connected to an intermediate shaft;
   a pump wheel of a hydrodynamic converter rotates with the intermediate shaft;
   a turbine wheel of the hydrodynamic converter rotates with a transmission;
   the intermediate shaft and the transmission are connected to an output shaft by a differential gear;
   the transmission comprises at least two coupling shafts which connect the turbine wheel of the hydrodynamic converter with the differential gear, wherein said at least two coupling shafts run parallel to the intermediate shaft;
   an additional hydrodynamic converter having a turbine wheel connected to the turbine wheel of the first hydrodynamic converter, and a pump wheel connected to the intermediate shaft.

17. A superimposed transmission according to claim 16, wherein at least one of said hydrodynamic converter and said additional converter is arranged in such a way that at least one of said at least two coupling shafts lies axially parallel to said at least one converter.

18. A method for operating a superimposed transmission according to claim 16, comprising:
   operating the superimposed transmission using only one of the hydrodynamic converter and the additional hydrodynamic converter, whereas in a first rotation speed range one of said converters is used and in a second rotation speed range the other of said converters is used.

19. A superimposed transmission according to claim 16, wherein the input shaft is connected to at least one auxiliary shaft via an additional transmission, the auxiliary shaft connectable to one of said at least two coupling shafts by an engageable coupling.

20. A superimposed transmission for driving a rotational speed-variable work machine, comprising:
   an input shaft connected to an intermediate shaft;
   a pump wheel of a hydrodynamic converter rotates with the intermediate shaft;
   a turbine wheel of the hydrodynamic converter rotates with a transmission;
   the intermediate shaft and the transmission are connected to an output shaft by a differential gear;
   the transmission comprises at least two coupling shafts which connect the turbine wheel of the hydrodynamic converter with the differential ear wherein said at least two coupling shafts run parallel to the intermediate shaft;
   wherein the input shaft is connected to at least one auxiliary shaft via an additional transmission, the auxiliary shaft connectable to one of said at least two coupling shafts by an engageable coupling;
   a number of auxiliary shafts and engageable couplings is provided which corresponds to the number of coupling shafts.

* * * * *

UNITED STATES PATENT AND TRADEMARK OFFICE
CERTIFICATE OF CORRECTION

| | | |
|---|---|---|
| PATENT NO. | : 8,663,047 B2 | Page 1 of 1 |
| APPLICATION NO. | : 12/999528 | |
| DATED | : March 4, 2014 | |
| INVENTOR(S) | : Marco Schroth et al. | |

It is certified that error appears in the above-identified patent and that said Letters Patent is hereby corrected as shown below:

ON THE TITLE PAGE, ITEM (57) IN THE ABSTRACT

Line 10, delete "which connection" and insert --connecting--

IN THE CLAIMS

Claim 5, Column 9, Line 4 delete "shaft" and insert --shafts--

Claim 7, Column 9, Line 13 after "by" insert --means of--

Claim 11, Column 9, Line 29 delete "shaft" and insert --shafts--

Claim 20, Column 10, Line 42 delete "ear" and insert --gear--

Signed and Sealed this
Twenty-third Day of September, 2014

Michelle K. Lee
*Deputy Director of the United States Patent and Trademark Office*